United States Patent [19]

Sweet, III

[11] 4,160,740

[45] Jul. 10, 1979

[54] INHIBITED AQUEOUS, METHOXYPROPANOL COOLANT ADJUSTED TO A pH BETWEEN ABOUT 6 AND 9

[75] Inventor: Forest H. Sweet, III, Lake Jackson, Tex.

[73] Assignee: The Dow Chemical Company, Midland, Mich.

[21] Appl. No.: 842,651

[22] Filed: Oct. 17, 1977

[51] Int. Cl.$^2$ ............................................... C09K 5/00
[52] U.S. Cl. .......................................... 252/75; 252/74
[58] Field of Search .............................. 252/73, 74, 75

[56] References Cited

U.S. PATENT DOCUMENTS

| | | | |
|---|---|---|---|
| 2,384,553 | 9/1945 | Kiffer | 252/75 |
| 2,491,222 | 12/1949 | Smith et al. | 252/75 |
| 2,736,709 | 2/1956 | Glickman et al. | 252/74 |
| 2,937,146 | 5/1960 | Cutlip et al. | 252/75 |
| 3,553,137 | 1/1971 | Woods | 252/75 |
| 3,935,125 | 1/1976 | Jacob | 252/75 X |
| 3,962,109 | 6/1976 | Oberhofer et al. | 252/74 X |

FOREIGN PATENT DOCUMENTS 621174 5/1961 Canada.

OTHER PUBLICATIONS

Miller, "Methoxy Propanol Automotive Antifreeze", Soap & Chemical Specialties, Oct. 1967, pp. 68, 70, 72, 76, 212, 213.

*Primary Examiner*—Harris A. Pitlick
*Attorney, Agent, or Firm*—David H. Fifield

[57] ABSTRACT

A coolant comprising water and one of 1-methoxy-2-propanol, 2-methoxy-1-propanol or mixtures thereof, resistant to degradation of fluoroelastomers and which is inhibited against corrosion of ferrous metals, aluminum and solder is disclosed. The desired coolant is prepared by reacting in situ or adding the reaction product of one or more phosphoric acids and an inorganic base selected from potassium hydroxide, sodium hydroxide or mixtures thereof, and optionally contains, as a copper or brass deactivator mercaptobenzothiazole, a benzotriazole, a sodium or potassium salt of mercaptobenzothiazole or a benzotriazole, or mixtures of these, wherein the pH of the coolant is adjusted to between about 6 and about 9 by balancing the relative amounts of phosphoric acids and inorganic bases to attain said pH. For example, about 53 parts 1-methoxy-2-propanol, 46 parts water, 0.8 parts $K_2HPO_4$, 0.1 part orthophosphoric acid and 0.1 part sodium tolutriazole yield a coolant of about pH 8 which gives low corrosion of metals commonly employed in cooling systems and does not induce excessive swelling or cracking and crazing of fluoroelastomers.

13 Claims, No Drawings

INHIBITED AQUEOUS, METHOXYPROPANOL COLLANT ADJUSTED TO A pH BETWEEN ABOUT 6 AND 9

BACKGROUND OF THE INVENTION

Aqueous 1-methoxy-2-propanol has been employed as coolant in ebullient cooling systems for heavy-duty stationary engines and for standard circulating cooling systems in mobile internal combustion engines, including rotary engines.

Common antifreezes based on methanol, ethanol, propanol, ethylene glycol, other glycols or polyglycols or glycerine have been inhibited with soluble phosphate salts in combination with borate salts and optionally mercaptobenzothiazole at pH of between about 7.5 and 9; U.S. Pat. No. 2,384,553. Phosphate or borate salts of alkanolamines have also been employed in coolants as inhibitors; U.S. Pat. No. 1,992,689. In propylene glycol based aqueous coolant, 1 percent dipotassium phosphate has been recommended as a corrosion inhibitor. One older teaching, Canadian Pat. No. 621,174, mentions that minor amounts of conventional antioxidants and corrosion inhibitors may be employed in methoxypropanol, e.g., phenols, amines, phosphates, mercaptans and sulfides. A later teaching notes that common inhibitors for glycol coolants are not soluble in concentrated methoxypropanol; *Soap and Chem. Specialties*, (Oct., 1967), p. 76. Subsequently, U.S. Pat. 3,553,137 teaches that alkali metal nitrites, piperazines and benzotriazole are useful as corrosion inhibitors for aqueous methoxypropanol coolant.

SUMMARY OF THE INVENTION

It has been found that when aqueous methoxypropanol based coolant is employed with standard inhibitors in internal combustion (I.C.) engines having fluoroelastomer gaskets and seals, the coolant causes extreme swelling, crazing and cracking of such fluoroelastomers. This eventually leads to their disintegration. I have found that this problem of attack on fluoroelastomer sealing materials may be avoided by employing the coolant of this invention and still attain satisfactory cooling and avoid excessive corrosion of metallic engine parts which contact the coolant. Even at zero reserve alkalinity, the invention composition avoids excessive corrosion.

These beneficial effects are accomplished by using as coolant or coolant additive the invention composition comprising the reaction product of:

(A) about 1–70 parts by weight, preferably 10–60, of one of 1-methoxy-2-propanol, 2-methoxy-1-propanol, or mixtures thereof;

(B) about 30–98 parts by weight, preferably 40–80, of water;

(C) about 0.01–30 parts by weight, preferably 0.01–15, of ortho-, meta- or pyrophosphoric acid or mixtures thereof;

(D) about 0.01–30 parts by weight, preferably 0.01–15, of sodium hydroxide, potassium hydroxide or mixtures thereof; and (E) optionally, about 0–5 parts by weight, preferably 0.001–2 of mercaptobenzothiazole, benzotriazole or tolutriazole or sodium or potassium salt of any of the three, or mixtures of any of these;

wherein the pH of the composition is adjusted to between about 6 and about 9, preferably about 7 and about 8.5 by balancing the relative amounts of components (C) and (D) to attain said pH. Inasmuch as the above invention contemplates reaction between components (C) and (D), an equivalent amount of the salt derived from the neutralization reaction of (C) and (D) may suitably be substituted for them and a sufficient quantity of (C) or (D) added to attain the required pH, and still practice the invention.

The term "equivalent quantity of amount" of a salt of (C) and (D) means that amount of salt which is produced by the neutralization reaction between a specified quantity of (C) and (D) and any stoichiometric excess of either (C) or (D). For example, if 10 parts $H_3PO_4$ and 10 parts NaOH are designated (considerations of pH aside), 8.0 parts $Na_2HPO_4$ and 7.5 parts $Na_3PO_4$ may be substituted or 14.5 parts $Na_2HPO_4$ and 1.8 parts NaOH may be substituted.

Included within the above composition are both a full fill coolant, ready to add to a cooling system and a concentrate which may be added to existing aqueous, methoxypropanol coolant to reinhibit same after inhibitor depletion following some period of coolant use. Such a reinhibiting concentrate comprises about 1–25 parts (A); about 50–98 parts (B); about 1–30 parts (C); about 1–30 parts (D) and optionally about 0.01–5 parts (E) and has a pH within the range stated.

The invention also comprises a preferred method for inhibiting an aqueous, methoxypropanol based coolant against the corrosive effects of said coolant in contact with metals and against the degradative effects of said coolant in contact with fluoroelastomers in a process comprising:

(1) dissolving in said coolant about 0.6–1.8 parts per hundred by weight of (C) which is one or more phosphoric acids and about 0.4–1.8 parts per hundred by weight of (D) which is sodium hydroxyide, potassium hydroxide or mixtures thereof, or an equivalent quantity of the salt of (C) and (D), both (C) and (D) being based on the water in said coolant, and (2) optionally dissolving in said coolant about 0.05–0.2 part per hundred by weight of (E) which is benzotriazole, tolutriazole or mercaptobenzothiazole, a sodium or potassium salt of any of the three, or is a mixture thereof, said 0.05–0.2 part being based on the methoxypropanol, and (3) adjusting the pH of said coolant to between about 6 and 9 by balancing the relative amounts of components (C) and (D) to attain said pH.

In a preferred process, methoxypropanol comprises primarily 1-methoxy-2-propanol; in another (C) comprises primarily orthophosphoric acid; in another (D) comprises primarily potassium hydroxide; and in another (E) comprises primarily the sodium salt of tolutriazole. Most preferably the pH is adjusted to between about 8 and 8.5.

In another preferred embodiment, dipotassium phosphate and a suitable quantity of orthophosphoric acid are substituted for (C) and (D). A preferred composition has a reserve alkalinity equal to or greater than about two.

DETAILED DESCRIPTION OF THE INVENTION

The term fluoroelastomer, as used herein, refers to the well-known elastomers which have been described by R. G. Arnold et al. in *Rubber Chem. & Tech.*, 46 (3): pp. 619–652 (1973). This description is hereby incorporated by reference. Included are copolymers of vinylidene fluoride, fluorosilicones and copolymers of perfluoro(alkyl vinyl ethers), for example. Common fluoroelastomers are sold under the trade names Viton brand fluoroelastomers, Fluorel brand elastomers, Kel-F brand elastomers, and Silastic LS brand fluorosilicone rubbers, among others.

The coolant composition of the invention is prepared by mixing the components in their stated ratios. For ease of dissolution, it is convenient to first dissolve components (C) and (D) or their equivalent salt in component (B) and then mix in component (A) in which component (E), if employed, has been previously dissolved.

Component (A) is 1-methoxy-2-propanol, 2-methoxy-1-propanol or mixtures thereof. Preferably, component (A) is primarily 1-methoxy-2-propanol which is the predominant isomeric form of methoxypropanol. Preferably, (A) is about 50–55 parts with (B) about 45–50 parts in the full fill coolant and (A) is about 15–25 parts and (B) about 55–75 parts of the reinhibitor concentrate.

Component (C) is a phosphoric acid or mixture of phosphoric acids. Preferred are orthophosphoric, metaphosphoric acids or pyrophosphoric acid, with orthophosphoric acid being most preferred. Component (D) is sodium hydroxide, potassium hydroxide or mixtures thereof. Preferably, (D) is potassium hydroxide. Components (C) and (D) are present in the amounts of about 0.01–30 parts and 0.01–30 parts, preferably 0.01–15 and 0.01–15 parts, respectively, with the proviso that within the designated range, (C) is a function of (D) and vice versa; for a given amount of one component, the other must be appropriately adjusted so that the final pH attained in the coolant is between about 6 and 9, preferably between about 7 and 8.5. This can easily be determined by adding a given amount of (C) to components (A) and (B), then adding (D), while monitoring the mixture with a pH meter, until the designated pH is attained. Alternatively, as mentioned above, the equivalent quantity of the neutralization salt of (C) and (D) may be added and the pH adjusted by addition of (C) or (D), as appropriate.

Preferably, (C) and (D) are present in about 0.05–1 and 0.05–1 part, respectively, in the full fill composition, and are most preferably present in about 0.2–0.8 part and about 0.2–0.8 part, respectively. In the reinhibitor concentrate (C) and (D) are preferably present at about 5–15 parts and 5–15 parts, respectively, when (A) and (B) comprise about 15–25 parts and about 55–75 parts of the reinhibitor, respectively.

Component (E) is optionally added to provide protection against corrosion of copper or brass metals. When employed, it is suitably present in about 0.001–5 parts by weight; preferably about 0.001–2 parts. Component (E) is selected from mercaptobenzothiazole, benzotriazole and tolutriazole or mixtures thereof. They are available per se (referred to as their acid form) or as their sodium or potassium salts (generally as 50 percent aqueous solutions) and the terms as employed herein are meant to encompass either the acid or salt form. Tolutriazole, acid form or sodium salt, is preferred in the invention. Component (E) is preferably employed in about 0.001–2 parts, most preferably 0.01–0.1 part, in the full fill coolant and preferably about 0.01–5 parts, most preferably 0.1–1.5 parts, in the reinhibitor concentrate.

Whenever the term "part" is employed, it refers to part by weight.

SPECIFIC EMBODIMENTS

Example 1—Comparative

A. To about 53 parts 1-methoxy-2-propanol (including a minor amount, about 1 part, of the 2-methoxy-1-propanol isomer) and about 46 parts deionized water, 0.5 part dipotassium phosphate and 0.1 part sodium tolutriazole are added. The pH of this solution is about 11. In this solution, a cured sample of Viton E-60C brand fluoroelastomer is immersed at about 125° C. After 7 days, examination of the fluoroelastomer sample reveals severe cracking which causes the sample to fall apart when handled.

B. Substitution of 0.4 part mercaptobenzothiazole for the sodium tolutriazole does not change the results.

C. The same solution, prepared without either sodium tolutriazole or mercaptobenzothiazole, causes the same severe cracking of the fluoroelastomer.

Example 2—Full Fill Formulation

A solution is prepared as described in 1A, above. To samples of this solution are added about 0.5 part of orthophosphoric acid and varying amounts of KOH so that the samples attain pH values of about 10, 9, 8 and 7. At pH 10, the cracking of the fluoroelastomer is less than that observed in Example 1 and at pH 9 the cracking is generally limited to the surface of the fluoroelastomer. At pH 8 and pH 7, cracking of the fluoroelastomer is not observable to any appreciable extent.

Example 3—Full Fill

A solution is prepared by combining 53 parts 1-methoxy-2-propanol (containing 1–2 parts of the primary alcohol isomeric form), 0.55 part H$_3$PO$_4$, 0.1 part sodium salt of tolutriazole, 1 part of potassium hydroxide 50 percent aqueous solution (0.5 part dry) to bring the pH to about 8 and sufficient additional water to bring the total solution to 100 parts. This solution, prepared by separate addition of components (C) and (D) of the invention, shows the same resistance to cracking of fluoroelastomer when tested as described in Example 2. When preparing the coolant in this fashion by reacting components (C) and (D), it is preferable to combine (C) and (D) quickly. When combined slowly, a phase separation occurs which is undesirable from a processing standpoint.

Further testing of this coolant of the invention according to ASTM 1384 corrosion test shows that inhibition against metal corrosion is very good.

| Corrosion Loss in mg/4 sq. in. coupon | | |
|---|---|---|
| | Observed | Allowable |
| Copper | 6 | 10 |
| Solder | 4 | 20 |
| Brass | 6 | 10 |
| Steel | +3 | 10 |
| Cast Iron | +2 | 10 |
| Aluminum | 3 | 30 |

+indicates weight gain.

Example 4—Reinhibitor Concentrate

A concentrated reinhibitor solution is prepared by combining about 20 parts methoxypropanol (about 97–98 percent 1-methoxy-2-propanol, the remainder in the primary alcohol form), about 58 parts water, about 1.6 parts of an 85 percent aqueous H$_3$PO$_4$ solution (about 1.4 parts dry), about 17.8 parts of a 50 percent aqueous $K_2HPO_4$ solution (about 8.9 parts dry) and about 2.2 parts of a 50 percent aqueous sodium tolutriazole solution (about 1.1 parts dry). The resulting concentrate has a pH of about 8.

About 9 parts of this concentrate is added to about 40 parts water and about 51 parts of methoxypropanol. The resulting solution shows very good corrosion resistance and does not cause cracking of the fluoroelastomer when tested as in Example 1.

I claim:

1. An aqueous, methoxypropanol based coolant composition inhibited against corrosion of metals and against degradation of fluoroelastomers, which composition comprises the reaction product of:
    (A) about 1–70 parts by weight of one of 1-methoxy-2-propanol, 2-methoxy-1-propanol, or mixtures thereof;
    (B) about 30–98 parts by weight of water;
    (C) about 0.01–30 parts by weight of a phosphoric acid;
    (D) about 0.01–30 parts by weight of sodium hydroxide, potassium hydroxide or mixtures thereof;
wherein the pH of the composition is adjusted to between about 6 and about 9 by balancing the relative amounts of components (C) and (D) to attain said pH.

2. The composition of claim 1 which further comprises about 0.001–5 parts by weight of mercaptobenzothiazole, benzotriazole or tolutriazole or a sodium or a potassium salt of any of the three, or mixtures of any of same.

3. The composition of claim 1 comprising about 10–60 parts component (A); about 40–80 parts component (B); about 0.01–15 parts component (C); and about 0.01–15 parts component (D).

4. The composition of claim 1 wherein the relative amounts of components (C) and (D) are balanced to attain a pH of about 8.

5. The composition of claim 1 wherein component (A) primarily comprises 1-methoxy-2-propanol.

6. The composition of claim 5 wherein component (C) primarily comprises orthophosphoric acid and component (D) primarily comprises potassium hydroxide.

7. The composition of claim 6 which further comprises about 0.001–5 parts of tolutriazole or sodium salt thereof.

8. The composition of claim 7 comprising about 50–55 parts component (A); about 45–50 parts component (B); about 0.2–0.8 part component (C); about 0.2–0.8 part component (D) and about 0.01–0.1 part of the sodium salt of tolutriazole.

9. The composition of claim 6 comprising about 15–25 parts 1-methoxy-2-propanol; about 55–75 parts water; about 5–15 parts orthophosphoric acid; about 5–15 parts potassium hydroxide; and about 0.1–1.5 parts sodium salt of tolutriazole.

10. The composition of claim 1 wherein the measured reserve alkalinity is equal to or greater than about two.

11. A process for inhibiting a coolant, comprising water and methoxypropanol, against the corrosive effects of said coolant in contact with metals and against the degradative effects of said coolant in contact with fluoroelastomers said process comprising dissolving in said coolant about 0.6–1.8 parts per hundred parts water of (C), which is one or more phosphoric acids and about 0.6–1.8 parts per hundred parts water of (D), which is sodium hydroxide, potassium hydroxide or mixtures thereof, or the equivalent amount of the neutralization salt of (C) and (D), and optionally dissolving in said coolant about 0.05–0.2 part per hundred parts methoxypropanol of (E) which is mercaptobenzothiazole, benzotriazole, tolutriazole or their sodium or potassium salt, or mixtures thereof, and adjusting the pH of said coolant to between about 6 and 9 by balancing the relative amounts of components (C) and (D) to attain said pH.

12. The process of claim 11 wherein the methoxypropanol is comprised primarily of 1-methoxy-2-propanol.

13. The process of claim 12 wherein component (C) is comprised primarily of orthophosphoric acid and component (D) is comprised primarily of potassium hydroxide and component (E) is comprised primarily of the sodium salt of tolutriazole, and the pH is adjusted to between about 8 and 8.5.

* * * * *